Oct. 13, 1970 HIROMICHI KONDO ET AL 3,534,243

INVERTER WITH STARTING CIRCUIT

Filed Jan. 23, 1968 4 Sheets-Sheet 1

INVENTORS
HIROMICHI KONDO
TOKIHO NAKADA
BY
Buckman and Archer
ATTORNEYS

INVENTORS
HIROMICHI KONDO
TOKIHO NAKADA
BY
Buckman and Archer
ATTORNEYS

INVENTORS
HIROMICHI KONDO
TOKIHO NAKADA
BY
Buchman and Archer
ATTORNEYS

INVENTORS
HIROMICHI KONDO
TOKIHO NAKADA
BY Buckman and Archer
ATTORNEYS

United States Patent Office 3,534,243
Patented Oct. 13, 1970

3,534,243

INVERTER WITH STARTING CIRCUIT

Hiromichi Kondo and Tokiho Nakada, Amagasaki-shi, Japan, assignors to Mitsubishi Denki Kabushiki Kaisha, Tokyo, Japan Filed Jan. 23, 1968, Ser. No. 699,834
Claims priority, application Japan, Jan. 24, 1967, 42/6,304; June 7, 1967, 42/36,355; July 15, 1967, 42/45,588; Oct. 12, 1967, 42/65,658
Int. Cl. H02m *7/52;* H03b *11/10*
U.S. Cl. 321—45 2 Claims

ABSTRACT OF THE DISCLOSURE

A controlled rectifier is serially connected with a tank circuit across a D.C. power supply. A series circuit having a capacitor, inductance, rectifier, and switch means is coupled to the tank circuit and is operative prior to conduction of the controlled rectifier to precharge the capacitor in the tank circuit.

This invention relates generally to an inverter device suitable for use as an AC power source for loads of low power factor, such as an electromagnetic pump for molten metal, a high frequency quenching device, a plasma confiner, a flotation refiner, or the like; and more specifically to a circuit for stabilizing the starting of such an inverter.

In the conventional inverter device which has hitherto been used as an AC power source for loads of low power factor, a compensation capacitor is used to improve the power factor of the load.

In view of the fact that a power factor-compensating capacitor is always used for loads of a low power factor, an inverter device of simplified circuit arrangement including the compensating capacitor, has been proposed. This inverter includes a tank circuit comprising a parallel circuit of the power factor-compensating capacitor and an inductance, the tank circuit being connected across a DC power supply by way of a charging inductance and a control-electroded, or controlled, rectifier, the rectifier being controlled at a frequency which has a certain definite relationship with the resonance frequency of the tank circuit and, at the same time, the period of the conduction state thereof being set so as to be less than a half-cycle of the resonance frequency of the tank circuit. However, when such an inverter device is actuated, a transient condition exists during half or one full cycle from the start of operation. In the transient condition, in fact, the phase difference between voltage and current is large, compared with the one in the steady state of operation. This is a cause for starting failure of the inverter.

The object of this invention is to eliminate starting failure by extending the time during which the reverse voltage is applied to a controlled rectifier when operation of the inverter starts.

The invention will be better understood from the following explanations made with reference to the attached drawings.

Figure 1:
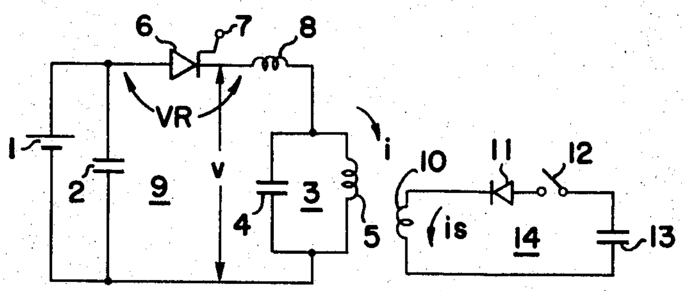
FIG. 1 is an electric circuit diagram showing an embodiment of this invention.

FIG. 1 in which an embodiment of the inverter device of this invention is shown, illustrates a DC power source 1 an auxiliary capacitor 2 connected across said DC power source, a tank circuit 3 connected across said DC power source 1, a capacitor 4 forming a part of the tank circuit 3, and an inductance 5 connected in parallel with the capacitor 4, to form the tank circuit 3, a rectifier 6 with control electrode connected between the DC power source 1 and the tank circuit 3, an input terminal 7 of rectifier 6, to which the turn-on signals are applied, and a charging inductor 8 connected in series with rectifier 6.

The main circuit 9 consists of the circuit elements 1 through 8. A coil 10 magnetically couples the inductance 5. A diode 11 has its cathode connected to one end of the coil 10 and a switch 12 has one end connected to the anode of the diode 11. The switch is closed only when starting operation. A capacitor 13 is connected between the other end of the switch 12 and the other end of the coil 10. Thus, there is provided a starting circuit, or auxiliary charging circuit 14, consisting of the circuit elements 10 through 13.

The inductance 5 may actually be a coil included in an electric machine such as electromagnetic pump, a high frequency quenching device, etc., and the capacitor 4 is for improving the power factor of such a load.

First, the operation of the main circuit 9 of this embodiment will be explained.

Figures 2A, 2B, 2C, 2D:
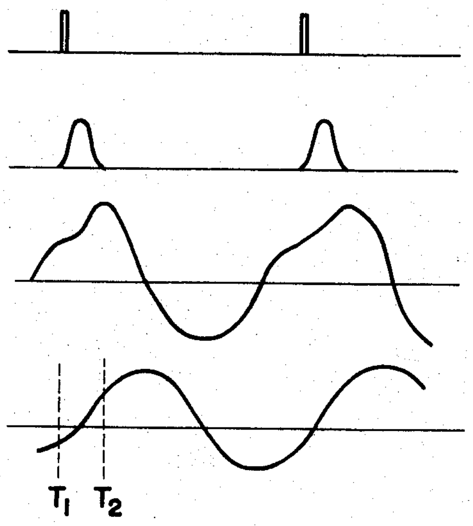
FIGS. 2A–2D show oscillograms for explaining the operation of the main circuit of the embodiment as in FIG. 1.

FIGS. 2A–2D show diagrams illustrating the operation of the main circuit of FIG. 1. FIG. 2A is a waveform of a turn-on signal applied to the turn-on signal input terminal 7, FIG. 2B is a waveform of the current flowing in the controlled rectifier 6, FIG. 2C is a waveform of the voltage appearing across the capacitor 4, and FIG. 2D is a waveform of the current flowing through the capacitor 4.

When a turn-on signal, such as in FIG. 2A, is applied to the terminal 7, an electric charge is supplied from the auxiliary capacitor 2 to the capacitor 4 of the tank circuit 3 via controlled rectifier 6 and the charging inductance 8.

Assuming that the capacitance of the auxiliary capacitor 2 is K($\mu$f.), the capacitance of the capacitor 4 is C($\mu$f.), the value of the charging inductance 8 is I($\mu$h.), the value of the inductance 5 is L($\mu$h), and if $$K \gg C \text{ and } I \gg L \qquad (1)$$

the controlled rectifier 6 begins conduction at the point $T_1$ as shown in FIG. 2D, and terminates its conduction at the point $T_2$, when the current flowing through inductance 8 is not yet sufficiently stable, i.e., when the charging voltage of the capacitor 4 becomes higher than the voltage of the DC power source 1. At the instant conduction of the controlled rectifier 6 is terminated, most of the electric energy stored in the tank circuit 3 is stored in the capacitor 4. However, at the instant controlled rectifier 6 has become non-conductive, the stored energy is transferred from capacitor 4 to the inductance 5, and then from inductance 5 back to the capacitor 4.

In other words, the circuit is oscillated at a frequency determined by the values of the capacitor 4 and the inductance 5. However, since the inductance 4 contains a load (resistance), such as a coil of high frequency quenching device, part of the energy is consumed in the load during the oscillation, and the recharged voltage of the capacitor 4 after non-conduction of controlled rectifier 6 must become lower than the value at the point when the rectifier terminated its conduction.

Therefore, if a turn-on signal is applied again to input terminal 7, the energy is supplied again to the capacitor 4 through the rectifier 6 and the charging inductance 8. Thus a series of said operations is repeated, and it becomes possible to obtain an oscillation such as shown in FIGS. 2A–2D through a sequence control wherein the voltage across capacitor 4 is detected and, when the detected value reaches a certain specific value, the controlled rectifier 6 is triggered into conduction.

In the above embodiment, one turn-on signal is applied to the input terminal 7 at each cycle of the voltage waveform appearing across the capacitor 4 shown in FIG. 2C. However, said turn-on signal may be applied thereto at each two or more cycles depending upon the associated load.

Also in the above embodiment, the condition $K \gg C$ is used in the Equation 1 for the convenience of explanation, however, such is not the indispensable condition for the operation. For example, $K \geqq C$ or $K < C$ may be used whereby the same result can be obtained. Further, the internal impedance 2 of the DC power source is not necessary. The DC power source 1 may be connected to the auxiliary capacitor 2 by way of a suitable impedance (not shown in the drawings).

It will be obvious from the foregoing explanation that in the embodiment of FIG. 1, energy is delivered from the DC power source 1 to the tank circuit 3 only during the positive half-cycle of the voltage (resonance frequency) appearing across the capacitor 4. However, it should be noted that energy may be supplied to the tank circuit 3 during the negative half-cycle, or during both positive and negative half cycles.

The supply of turn-on signals to the input terminal 7 should be synchronized with the resonance frequency of the tank circuit 3. It is necessary to supply turn-on signals from a separate pulse generator according to either principle of separate excitation or self-excitation.

In practice, the value of the inductance 5 varies considerably with the change in the state of a load. For example, in the high frequency hardening device, the inductance will greatly vary when a metal to be heated is either in or out of the coil. The resonance frequency of the tank circuit 3 varies accordingly. Thus viewed, a pulse generator using the self-excitation method is advantageous, since it is capable of automatically responding to the inductance variation.

Figure 3:
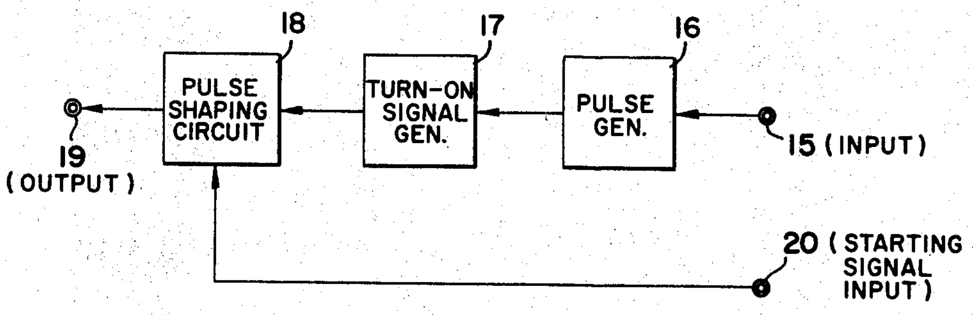
FIG. 3 is a block diagram showing a turn-on circuit for use in an inverter device according to this invention.

FIG. 3 is a block diagram showing a turn-on circuit of the self-excitation type suitable for use with an inverter device of this invention. In FIG. 3, 15 is an input terminal to which a voltage signal proportional to the voltage across capacitor 4 is applied, 16 is a pulse generator for generating a pulse at the time the input signal from the input terminal 15 decreases to zero, 17 is a turn-on signal generator for discriminating the polarity of the voltage waveform applied to the input terminal 15, and generates a turn-on signal while the voltage of the capacitor 4 is positive when said turn-on signal generator 11 is used for the embodiment as in FIG. 1. 18 is a pulse shaping circuit for shaping the turn-on signal from the turn-on signal generator 17, 19 is a turn-on signal output terminal at which the output of the pulse shaping circuit 18 appears and 20 is a starting signal input terminal to which a signal is applied to drive the pulse shaping circuit 18 in coincidence with the starting of the inverter.

The operation of the turn-on circuit will be explained more specifically by referring to FIG. 1 (main circuit) and FIGS. 2 and 3. When a starting signal is applied to the starting signal input terminal 20 when the inverter device is started, the pulse shaping circuit 18 is activated to provide a turn-on signal at output terminal 19. This occurs at the instant $T_1$ and is illustrated at FIG. 2A. When this turn-on signal is applied to the turn-on signal input terminal 7, the controlled rectifier 6 becomes conductive and thus a current as shown in FIG. 2B flows therein and a voltage as in FIG. 2C comes out across the capacitor 4. This terminal voltage across capacitor 4 is applied to the input terminal 15, and the pulse generator 16 generates a pulse when said terminal voltage comes near zero. The turn-on signal generator 17 detects the polarity of the terminal voltage of the capacitor 4, and generates a turn-on signal upon receiving a pulse from the pulse generator 16 at the instant when said terminal voltage is positive. This turn-on signal is shaped by the pulse shaping circuit thus producing a turn-on signal at $T_1$ in FIG. 2A.

The turn-on circuit will later be explained in detail by reference to FIG. 7.

Figure 4A:
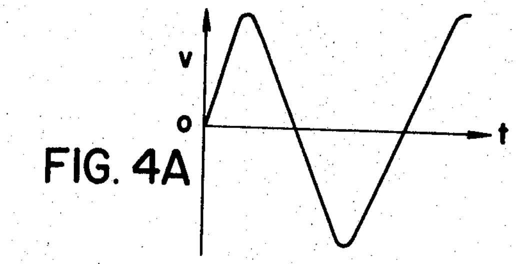
FIGS. 4A–4C show oscillograms explaining the starting operation of the main circuit of the embodiment of FIG. 1.
Figure 4B:
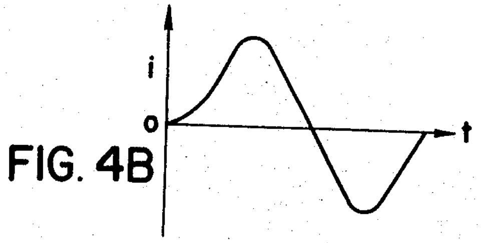
Figure 4C:
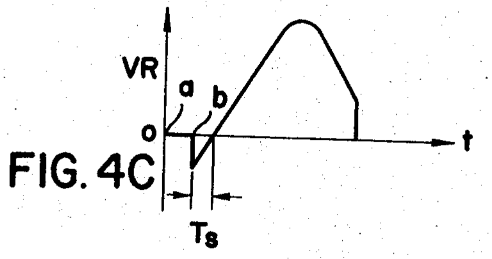

FIGS. 4A–4C show oscillograms illustrating the starting operation of the main circuit of FIG. 1. FIG. 4A is a waveform of the voltage across capacitor 4, FIG. 4B is a waveform of the current flowing in the inductance 5, and FIG. 4C is a waveform of the voltage produced between the anode and the cathode of controlled rectifier 6.

Figure 5A:
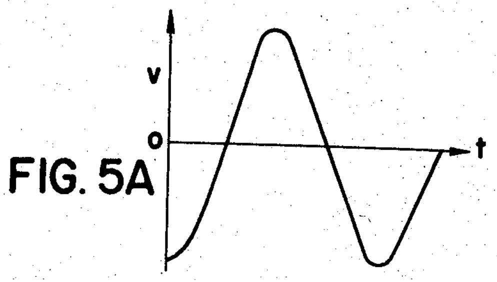
FIGS. 5A–5C show oscillograms of wave forms appearing at several points of the main circuit in FIG. 1 in the steady operating condition.
Figure 5B:
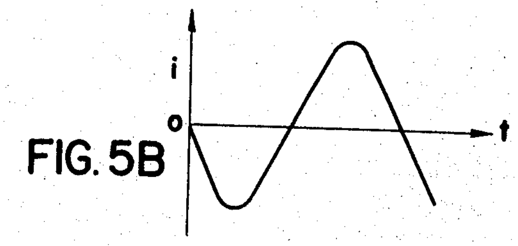
Figure 5C:
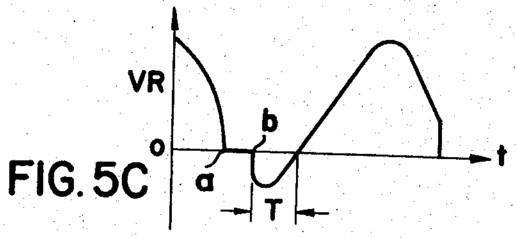

FIGS. 5A–5C show oscillograms of the main circuit of FIG. 1 under the normal operation. FIG. 5A is a waveform of the voltage across a capacitor 4, FIG. 5B is a waveform of the current flowing in the inductance 5, and FIG. 5C is a waveform of the voltage produced between the anode and the cathode of the rectifier 6. It is well known that a reverse voltage should be applied to a controlled rectifier for a certain specific period of time, after said rectifier has terminated its conduction, i.e., after the instant $b$ as in FIGS. 4 and 5. As shown in FIGS. 5A–5C, a reverse voltage is applied to the rectifier 6 for the relatively long period of time T under the steady operating condition. However, when a turn-on signal is applied to the turn-on signal input terminal 7 at start of operation, i.e., under the condition wherein no energy is applied to the tank circuit 3, it is observed that the period during which the reverse voltage is applied thereto is limited to an extremely short time $T_s$ as shown in FIGS. 4A–4C. This fact will be clearly evidenced when making a close study of the phase relationship between voltage and current.

Specifically, after the point $b$ of FIGS. 4A–4C, the current $i$ flowing in the inductance 5 becomes fairly large, that is, the energy having been supplied from the DC power source 1 to the capacitor 4 is rapidly flowing into the inductance 5. In contrast to this, in FIGS. 5A–5C, the capacitor 4 is being supplied with further energy from the inductance 5 even after the point $b$, and therefore the voltage across the capacitor 4 is further raised and, as the result, a high reverse voltage VR is applied to the controlled rectifier 6 for a relatively long period of time.

Because of said reasons, in the main circuit of FIG. 1, the time during which a reverse voltage is applied to the rectifier at start of operation is short in comparison with that under the steady operating condition. Consequently, there is a large possibility of inversion failure occurring at start of operation.

Now, the operation of the starting circuit 14 of FIG. 1 will be explained with reference to FIG. 6. FIG. 6A is a waveform of the current flowing in the coil 10. FIG. 6B is a waveform of the current flowing in the inductance 5, FIG. 6C is a waveform of the voltage across the capacitor 4, and FIG. 6D is a waveform of the voltage between the anode and the cathode of the rectifier 6.

Figures 6A, 6B, 6C, 6D:
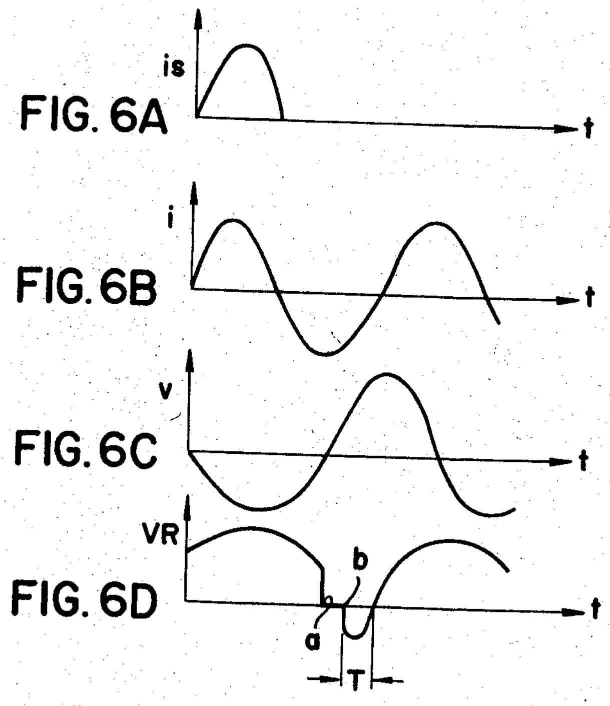
FIGS. 6A–6D show oscillograms explaining the operation of the circuit of FIG. 1.

When the switch 12 is closed prior to applying a turn-on signal to the input terminal 7 of the rectifier 6, a current $i_s$ (only one half-cycle) flows in coil 10, as shown in FIG. 6A. After this operation, when the controlled rectifier 6 is activated at the instant "$t_s$," i.e., under a nearly normal operating condition, a reverse voltage is applied to the rectifier 6 for a sufficiently long period of time T as shown in FIG. 6D.

In this case, the capacitor 13 should have been charged with a suitable potential in prior to closing the switch 12. At the same time, the direction of the current flowing in the inductance 5 induced by a half-wave of the current $i_s$ flowing in the coil 10, must be same as that of the current flowing in the inductance 5 upon conduction of said rectifier 6.

A controlled rectifier may be used in place of switch 12 and rectifier 11. If it is permissible to have current $i_s$ continue after start of operations, the switch 12 may be mechanical and further, the rectifier 11 may be omitted.

Figure 7:
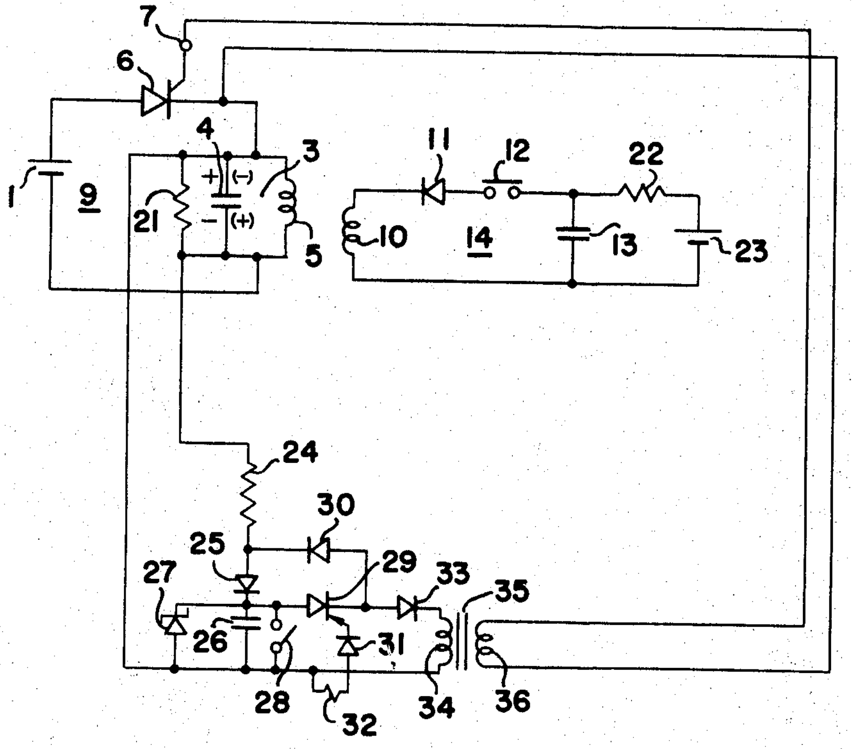
FIG. 7 is a circuit diagram showing the turn-on circuit of FIG. 3 as it is applied to the embodiment of FIG. 1.

FIG. 7 is a circuit diagram showing another embodiment of this invention, wherein the turn-on circuit of FIG. 3 is combined with the inverter of FIG. 1. Referring to FIG. 7, elements 1 through 18 are similar to those in FIG. 1. 21 is a load of the inverter device and is represented by a resistor in this embodiment. 22 is a charging resistor for the capacitor 13. 23 is a DC power source by which the capacitor 13 is charged 24 is a resistor, one end of which is connected to one end of the capacitor 4. 25 is a rectifier whose anode is connected to the other end of the resistor 24. 26 is a capacitor connected between the cathode of the rectifier 25 and the other end of the capacitor 4. 27 is a voltage limited element, such as a Zener diode, which is connected in parallel with the capacitor 25 and functions to maintain the charging voltage of the capacitor 26 at a specific value and at the same time to protect it. 28 is a switch which is connected in parallel with the capacitor 26 and is closed during non-operation of the inverter. 29 is a controlled rectifier having an anode connected to the point at which the diode 25 is connected to the capacitor 26. 30 is a rectifier having its anode connected to the cathode of the controlled rectifier 29 and its cathode connected to the point at which the resistor 24 is connected to the diode 25. 31 is a rectifier whose cathode is connected to the control electrode of the controlled rectifier 29. 32 is a resistor which is connected between the points at which the anode of the rectifier 31 is connected to the capacitors 26 and 4. This resistor 32 controls the current flowing into the control electrode of the rectifier 29. 33 is a rectifier whose anode is connected to the cathode of the rectifier 29. 34 is a primary winding of a pulse transformer 35 which is connected between the anode of the rectifier 33 and the connection point of capacitors 26 and 4. 36 is a secondary winding of the pulse transformer 35 connected between the cathode of the rectifier 6 and the signal input terminal 7.

The circuit comprising components 24 through 36 constitutes the circuit for effecting self-excitation of the inverter device and also constitutes the circuit for stopping the operation of the inverter device. This circuit serves to energize the controlled rectifier 6 with a minimum of energy and is formed so that rectifier 6 is activated every time capacitor 4 is charged with the polarity shown in FIG. 7 (no brackets). As will be obvious from FIG. 6, said circuit functions to continue its oscillation self-excitingly, once the switch 12 is closed.

When the switch 12 is closed, the capacitor 4 is charged so that its terminal voltage becomes charged with the polarity shown in FIG. 7 (no brackets). The terminal voltage of the capacitor 4 is discharged across the inductance 5, and the polarity is reversed (as shown in brackets). Then, a current flows from the capacitor 4 through the resistor 24, rectifier 25, and capacitor 26 back to the capacitor 4. Thus, the capacitor 26 is charged up.

In the subsequent reversing of the polarity of the voltage across the capacitor 4, thus retaining to the initial condition, a current flows from the capacitor 4 through the resistor 32, rectifier 31, control electrode and cathode of rectifier 29, rectifier 30, and resistance 24 back to the capacitor 4, resulting in the energization of the rectifier 29. Then, a current flows from the capacitor 26 to the primary winding 34 via the rectifiers 29 and 33, and a pulse signal is produced in the secondary winding 36. The pulse thus produced is applied to the electrode 7 of the controlled rectifier 6. A series of these actuations is repeated.

Figure 8:
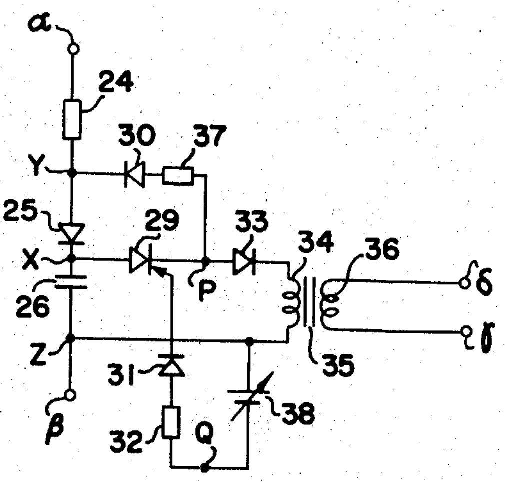
FIG. 8 is a circuit diagram showing a modification of one part of FIG. 7.

If the switch 28 is closed, the electric energy to energize the rectifier 6 cannot be stored in the capacitor 26 and consequently the oscillation stops. FIG. 8 shows a circuit commonly used for self-driving inverters and turning them off. In this figure, the elements 24–36 are similar to those in FIG. 7. 37 is a resistor, and 38 is a DC power source for bias purposes.

The bias DC power source 38 may be inserted between the resistor 37 and the point P. Also, the circuit may be so arranged that a voltage limited circuit is inserted between Y–Z and/or X–Z. A bypass circuit, including for instance a PNPN switching diode may be inserted between P and Q so as to prevent excess current in the control circuit of the controlled rectifier 29.

According to this invention, the coil 10 is electromagnetically coupled with the inductance 5 of the tank circuit, and an electric energy is supplied to the tank circuit 3 via coil 10 prior to starting the inverter, thus improving the starting characteristics of the unit.

Figure 9:
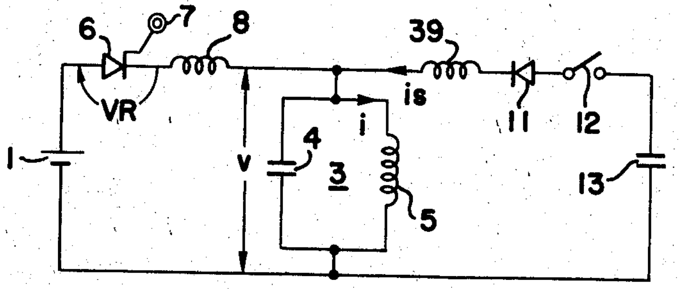
FIG. 9 is a circuit diagram showing another embodiment of this invention.

FIG. 9 is a circuit diagram showing another embodiment of this invention wherein the operation of the inverter is stabilized at the time of starting. In the figure, the elements 1 through 13 are similar to those in FIG. 1. 39 is a charging coil.

Figures 10A, 10B, 10C, 10D:
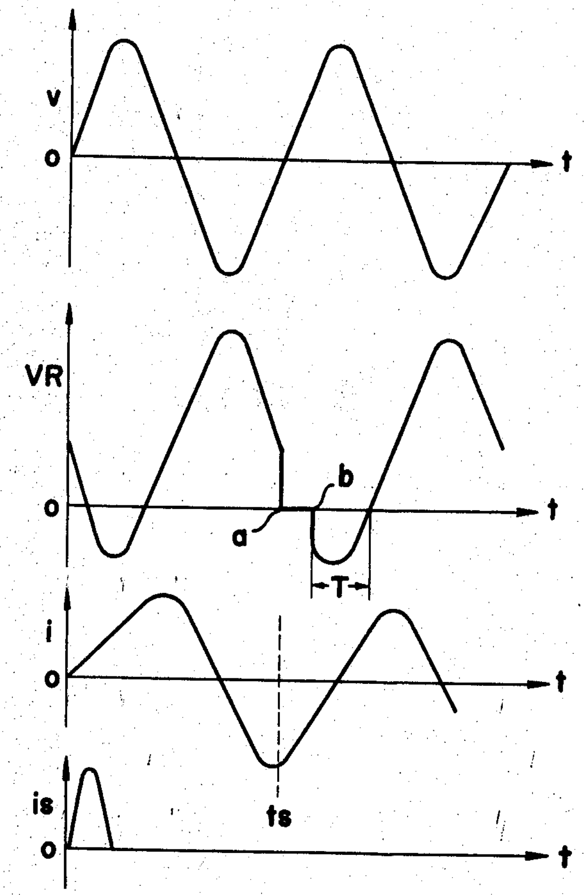
FIGS. 10A–10D show oscillograms explaining the operation of FIG. 9.

FIGS. 10A–10D are diagrams illustrating the operation of the embodiment shown in FIG. 9. FIG. 10A is a waveform of the voltage across the capacitor 4, FIG. 10B is a waveform of the voltage between the anode and the cathode of the controlled rectifier 6, FIG. 10C is a waveform of the current flowing in the inductance 5, and FIG. 10D is a waveform of the current flowing in the coil 39. When the switch 12 is closed, this is the discharge current from capacitor 13 to charge capacitor 4 through the coil 39 and rectifier 11.

The operation of the embodiment shown in FIG. 9 is explained by referring to FIGS. 10A–10D. When the switch 12 is closed before starting the inverter, only a half cycle of the current as in FIG. 10D flows in the coil 39. After this, the rectifier 6 is activated at the instant $t_s$, i.e., under a nearly normal operating condition as shown in FIG. 5. Then, a reverse voltage is applied to the controlled rectifier 6, for a sufficiently long period of time T as shown in FIG. 10B.

It is necessary that the capacitor 13 is charged to a suitable potential prior to closing the switch 12. It is also necessary that the direction of half-wave of the current is shown in FIG. 10D flowing in the coil 39 is the same as that of the current $i$ shown in FIG. 10C which starts flowing in the inductance 5 when rectifier is turned on. The functions of the switch 12 and the rectifier 11 are the same as those in FIG. 1. The coil 39 may be omitted if the residual inductance of the lead wire connecting capacitor 13 to the tank circuit 3 is large enough.

According to this invention, as has been explained above, it is possible through a very simple circuit arrangement, to elongate the time during which a reverse voltage is applied to the controlled rectifier at the time of starting the inverter and thus stabilize the starting operation.

We claim:

1. A circuit for stabilized starting of an inverter wherein a controlled rectifier is serially connected with a tank circuit across a DC power supply, said tank circuit including a capacitor and an inductance in parallel; said circuit comprising means operative prior to conduction of said controlled rectifier to charge the capacitor in said tank circuit in a polarity the same as that at which said capacitor is charged by the DC power supply when said controlled rectifier conducts, said last mentioned means comprising a closed series circuit having a capacitor, an inductance, a rectifier, and switch means; said inductance being coupled to the inductance of said tank circuit.

2. A circuit for stabilized starting of an inverter wherein a controlled rectifier is serially connected with a tank circuit across a DC power supply, said tank circuit including a capacitor and an inductance in parallel; said circuit comprising means operative prior to conduction of said controlled rectifier to charge the capacitor in said tank circuit in a polarity the same as that at which said capacitor is charged by the DC power supply when said controlled rectifier conducts, said last mentioned means comprising a series circuit having a capacitor, an inductance, a rectifier, and switch means; said series circuit being connected in parallel with said tank circuit.

References Cited

UNITED STATES PATENTS

| | | | |
|---|---|---|---|
| 2,143,366 | 1/1939 | Andrieu | 331—166 X |
| 3,323,076 | 5/1967 | Pelly | 331—117 |
| 3,351,779 | 11/1967 | Hehenkamp. | |
| 3,412,315 | 11/1968 | Hehenkamp | 321—46 X |

FOREIGN PATENTS

| | | |
|---|---|---|
| 1,046,118 | 12/1958 | Germany. |

WILLIAM H. BEHA, Jr., Primary Examiner

U.S. Cl. X.R.

331—117, 166